(12) United States Patent
Aoki

(10) Patent No.: US 10,824,360 B2
(45) Date of Patent: Nov. 3, 2020

(54) DATA CONNECTOR WITH MOVABLE COVER

(71) Applicant: INTEL CORPORATION, Santa Clara, CA (US)

(72) Inventor: Russell Aoki, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 15/826,523

(22) Filed: Nov. 29, 2017

(65) Prior Publication Data

US 2018/0151975 A1 May 31, 2018

Related U.S. Application Data

(60) Provisional application No. 62/427,268, filed on Nov. 29, 2016, provisional application No. 62/584,401, filed on Nov. 10, 2017.

(30) Foreign Application Priority Data

Aug. 30, 2017 (IN) .............................. 201741030632

(51) Int. Cl.
*H01R 13/453* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01); *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02);
(Continued)

(58) Field of Classification Search
CPC . H01R 13/447; H01R 13/453; H01R 13/4536
See application file for complete search history.

(56) References Cited

U.S. PATENT DOCUMENTS 2,458,153 A * 1/1949 Festge ................ H01R 13/4538
439/272
3,651,444 A * 3/1972 Desso ................ H01R 13/4538
439/141
(Continued)

OTHER PUBLICATIONS

Cady, Ed and Gannon, Mary. "A Historical Perspective on QSFP Connectors and Cabling Implementation." Connector Tips. https://www.connectortips.com/a-historical-perspective-on-qsfp-connectors-and-cabling-implementation/. Accessed Jul. 24, 2017.

*Primary Examiner* — Adrian S Wilson
(74) *Attorney, Agent, or Firm* — Barnes & Thornburg LLP

(57) ABSTRACT

A data connector to interface with a sled of a data center includes a main body, a plurality of guide shafts, and a cover. The main body includes electrical contacts. The guide shafts are associated with the main body, and each guide shaft extends along a corresponding longitudinal axis. The cover is coupled to the guide shafts such that the cover is slidable along the guide shafts in a direction defined by the longitudinal axes. The cover includes a movable door to provide protection to the electrical contacts of the main body when not in use.

25 Claims, 17 Drawing Sheets

(51) Int. Cl.

| | |
|---|---|
| G06F 16/174 | (2019.01) |
| G06F 21/57 | (2013.01) |
| G06F 21/73 | (2013.01) |
| G06F 8/65 | (2018.01) |
| H04L 12/24 | (2006.01) |
| H04L 29/08 | (2006.01) |
| G06F 11/30 | (2006.01) |
| G06F 9/50 | (2006.01) |
| H03M 7/30 | (2006.01) |
| H03M 7/40 | (2006.01) |
| H04L 12/26 | (2006.01) |
| H04L 12/813 | (2013.01) |
| H04L 12/851 | (2013.01) |
| G06F 11/07 | (2006.01) |
| G06F 11/34 | (2006.01) |
| G06F 7/06 | (2006.01) |
| G06T 9/00 | (2006.01) |
| H03M 7/42 | (2006.01) |
| H04L 12/28 | (2006.01) |
| H04L 12/46 | (2006.01) |
| H04L 29/12 | (2006.01) |
| G06F 13/16 | (2006.01) |
| G06F 21/62 | (2013.01) |
| G06F 21/76 | (2013.01) |
| H03K 19/173 | (2006.01) |
| H04L 9/08 | (2006.01) |
| H04L 12/933 | (2013.01) |
| G06F 9/38 | (2018.01) |
| G06F 9/48 | (2006.01) |
| G06F 12/02 | (2006.01) |
| G06F 12/06 | (2006.01) |
| G06T 1/20 | (2006.01) |
| G06T 1/60 | (2006.01) |
| G06F 9/54 | (2006.01) |
| G06F 8/656 | (2018.01) |
| G06F 8/658 | (2018.01) |
| G06F 8/654 | (2018.01) |
| G06F 9/4401 | (2018.01) |
| H01R 13/631 | (2006.01) |
| H05K 7/14 | (2006.01) |
| H04L 12/911 | (2013.01) |
| G06F 11/14 | (2006.01) |
| H04L 29/06 | (2006.01) |
| G06F 15/80 | (2006.01) |

(52) U.S. Cl.
CPC ............ *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/0709* (2013.01); *G06F 11/079* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(56) References Cited

U.S. PATENT DOCUMENTS

| | | | | | |
|---|---|---|---|---|---|
| 4,176,897 | A | * | 12/1979 | Cameron | H01R 13/44 439/137 |
| 4,832,613 | A | * | 5/1989 | Tsukakoshi | H01R 13/631 439/141 |
| 5,035,633 | A | * | 7/1991 | Kobayashi | G06K 7/0047 439/131 |
| 5,372,515 | A | * | 12/1994 | Miller | H01R 13/4536 439/138 |
| 5,716,224 | A | * | 2/1998 | Masuda | H01R 13/4536 439/138 |
| 6,058,356 | A | * | 5/2000 | Swanson | G01K 15/00 361/679.56 |
| 6,368,129 | B1 | * | 4/2002 | Wang | H01R 12/721 439/141 |
| 6,431,888 | B1 | * | 8/2002 | Crestin | H01R 13/4538 439/141 |
| 6,454,580 | B1 | * | 9/2002 | Hwang | G02B 6/4277 439/138 |
| 7,123,243 | B2 | * | 10/2006 | Kawasaki | G02F 1/13338 345/173 |
| 8,824,140 | B2 | * | 9/2014 | Prest | H04M 1/0249 361/679.56 |
| 9,004,930 | B2 | * | 4/2015 | Gualino | H01R 13/2421 439/136 |
| 9,439,305 | B2 | * | 9/2016 | Prest | G06F 1/1656 |
| D810,031 | S | * | 2/2018 | Sprenger | D13/156 |
| 10,021,798 | B2 | * | 7/2018 | Prest | G06F 1/1656 |
| 10,398,043 | B2 | * | 8/2019 | Prest | H05K 5/0217 |
| 2005/0130721 | A1 | * | 6/2005 | Gartrell | H04M 1/0283 455/575.8 |
| 2005/0135724 | A1 | * | 6/2005 | Helvajian | B64G 1/10 385/14 |
| 2006/0176524 | A1 | * | 8/2006 | Willrich | G06F 1/1616 358/474 |
| 2006/0268528 | A1 | * | 11/2006 | Zadesky | H04M 1/0202 361/728 |
| 2006/0273304 | A1 | * | 12/2006 | Cok | H01L 51/0096 257/40 |
| 2007/0158220 | A1 | * | 7/2007 | Cleereman | A45C 11/00 206/320 |
| 2008/0024470 | A1 | * | 1/2008 | Andre | G06F 1/1616 345/204 |

(56) References Cited

U.S. PATENT DOCUMENTS

| | | | | |
|---|---|---|---|---|
| 2009/0296325 A1* | 12/2009 | Morimoto | ............ | H04M 1/185 361/679.01 |
| 2010/0014232 A1* | 1/2010 | Nishimura | ........ | B29C 45/14073 361/679.3 |
| 2010/0061040 A1* | 3/2010 | Dabov | .................. | G06F 1/1626 361/679.01 |
| 2010/0091442 A1* | 4/2010 | Theobald | .................. | H05K 5/04 361/679.09 |
| 2010/0277439 A1* | 11/2010 | Charlier | ................ | G06F 1/1616 345/176 |
| 2011/0019123 A1* | 1/2011 | Prest | ........................ | C03C 19/00 349/58 |
| 2011/0164372 A1* | 7/2011 | McClure | ............... | G06F 1/1613 361/679.26 |
| 2011/0255218 A1* | 10/2011 | Pakula | .................. | G06F 1/1626 361/679.01 |
| 2016/0093979 A1* | 3/2016 | Sprenger | ............ | H01R 13/5213 439/136 |

* cited by examiner

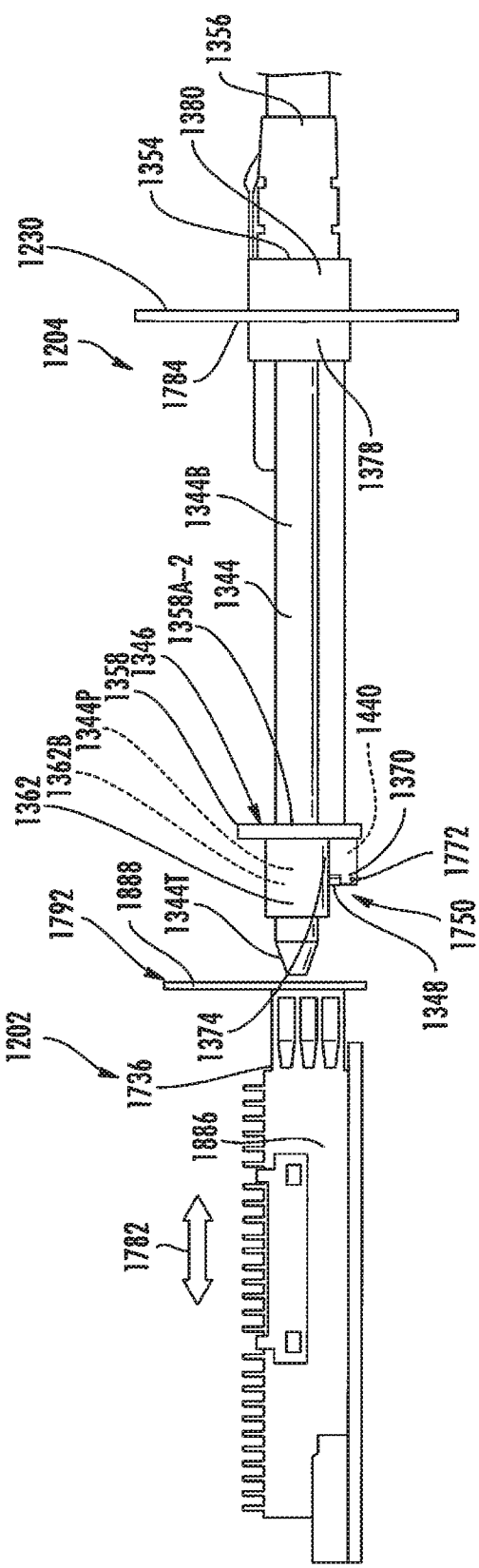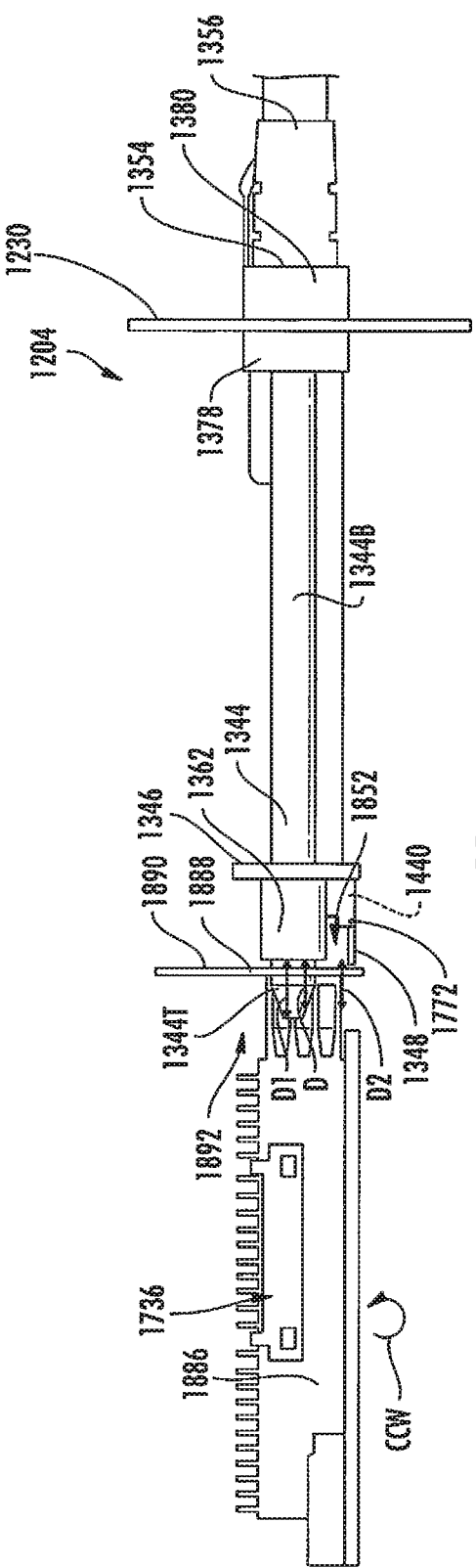

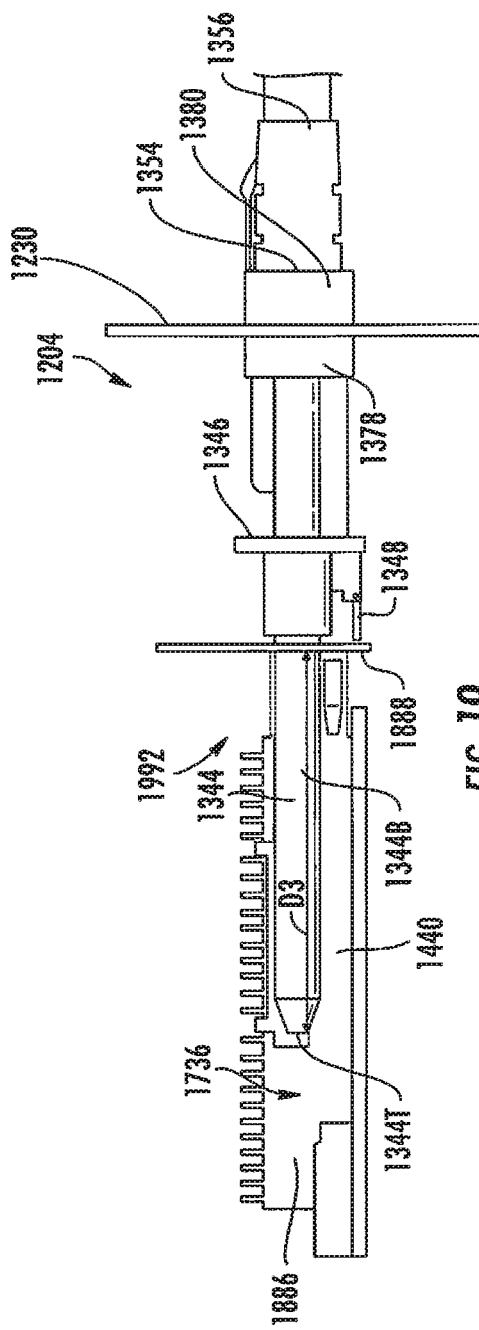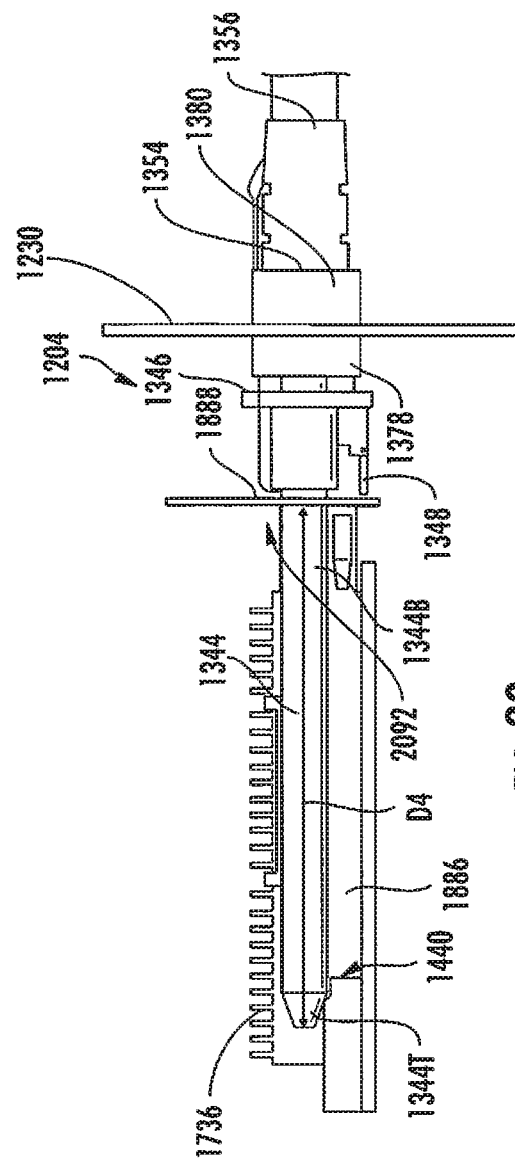

US 10,824,360 B2

DATA CONNECTOR WITH MOVABLE COVER

CROSS-REFERENCE TO RELATED APPLICATIONS

The present application claims the benefit of U.S. Provisional Patent Application No. 62/427,268, filed Nov. 29, 2016, Indian Provisional Patent Application No. 201741030632, filed Aug. 30, 2017, and U.S. Provisional Patent Application No. 62/584,401, filed Nov. 10, 2017.

BACKGROUND

Typical enterprise-level data centers can include several to hundreds of racks or cabinets, with each rack/cabinet housing multiple servers. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional rack systems are self-contained physical support structures that include a number of pre-defined server spaces. A corresponding server may be mounted in each pre-defined server space. A server mounted in the pre-defined server space may interface with a data connector coupled to the rack system. When the server is removed from the pre-defined server space or otherwise not installed in the server space, there is a risk that one or more components of the data connector of the rack system may be contaminated by foreign material or debris due to exposure to the local open environment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 17 is a side elevation view of the data connector spaced from the sled such that the data connector is in the first state of FIG. 13;

FIG. 18 is a side elevation view of interaction between the data connector and the sled such that the data connector is in the second state of FIG. 14;

FIG. 19 is a side elevation view of interaction between the data connector and the sled such that the data connector is in the third state of FIG. 15;

FIG. 20 is a side elevation view of interaction between the data connector and the sled such that the data connector is in the fourth state of FIG. 16;

DETAILED DESCRIPTION OF THE DRAWINGS

Figure 1:
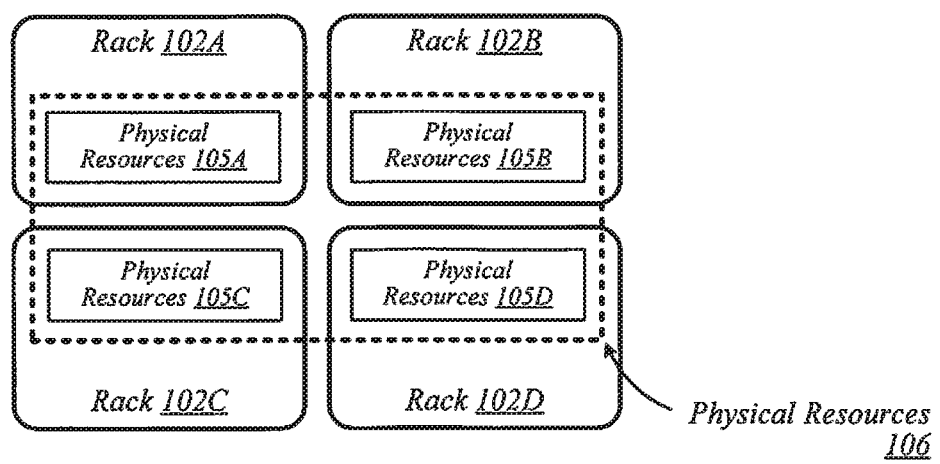
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance Furthermore, the sleds are configured to mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
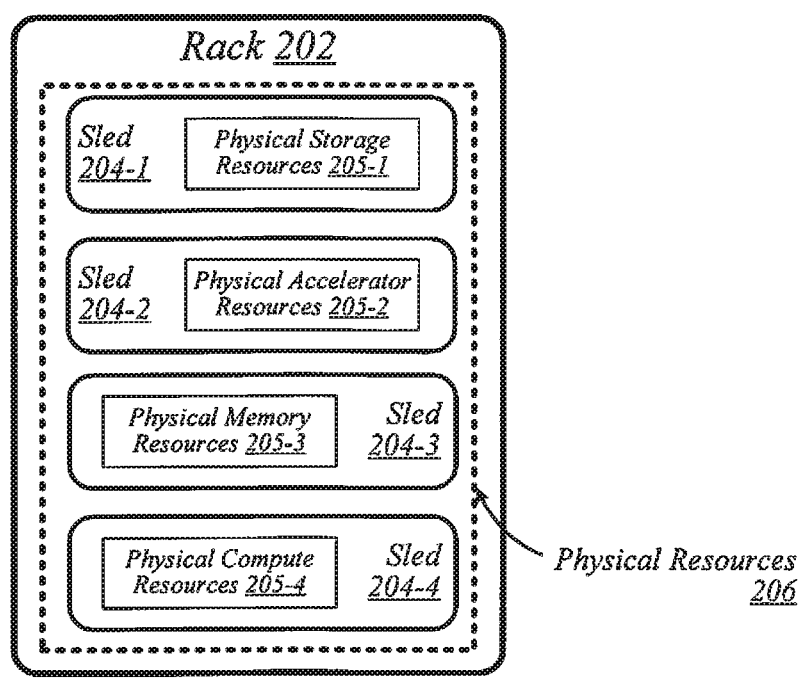
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
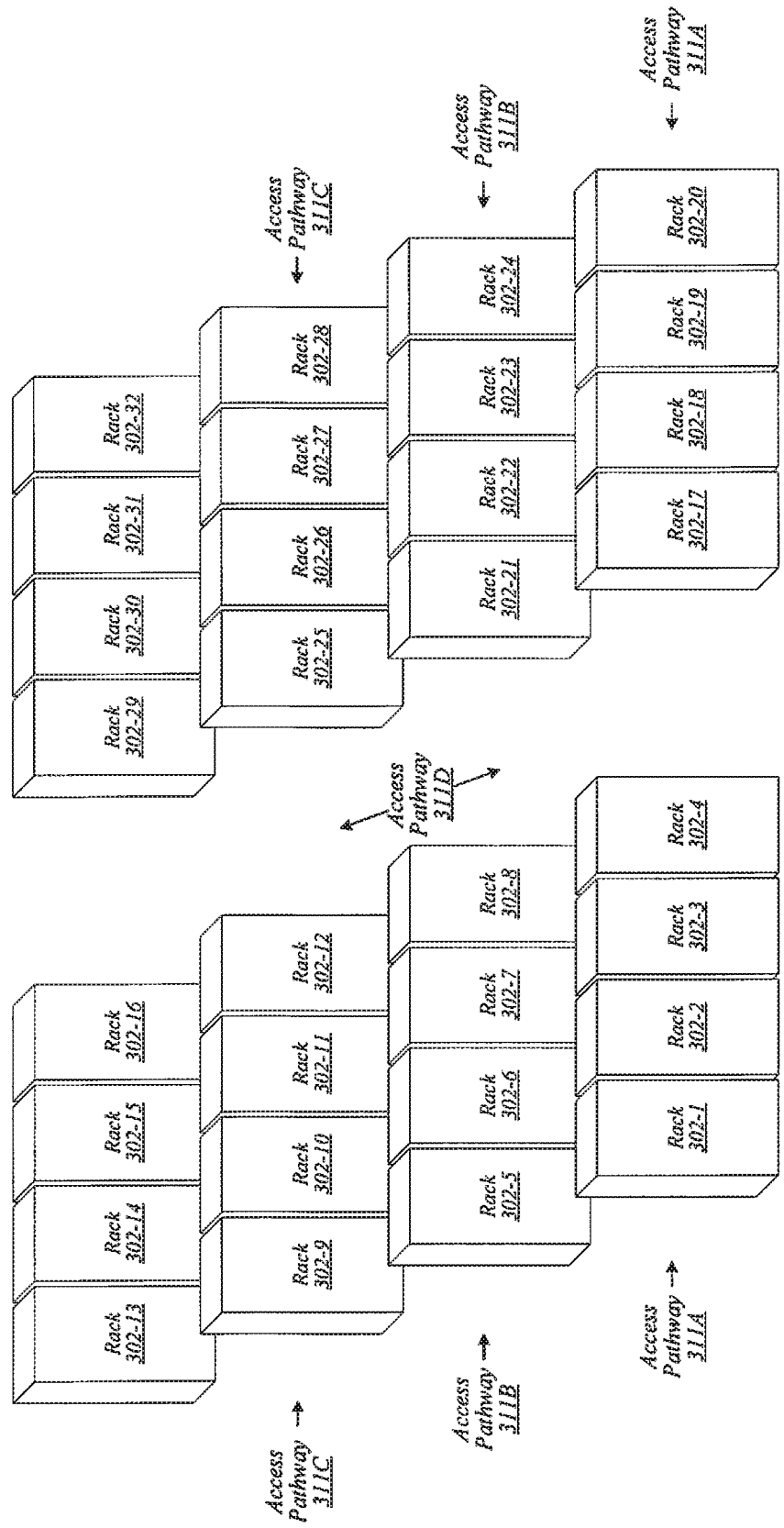
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
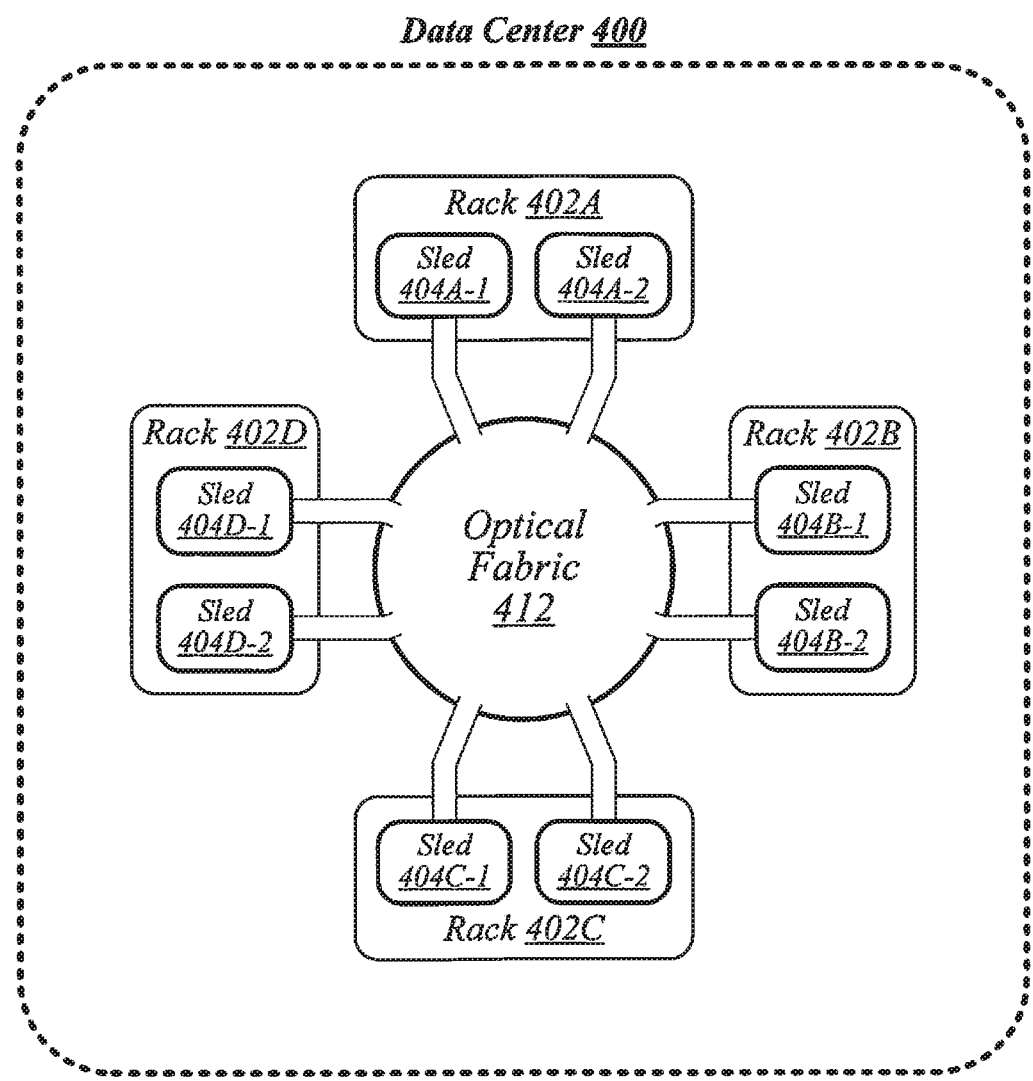
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
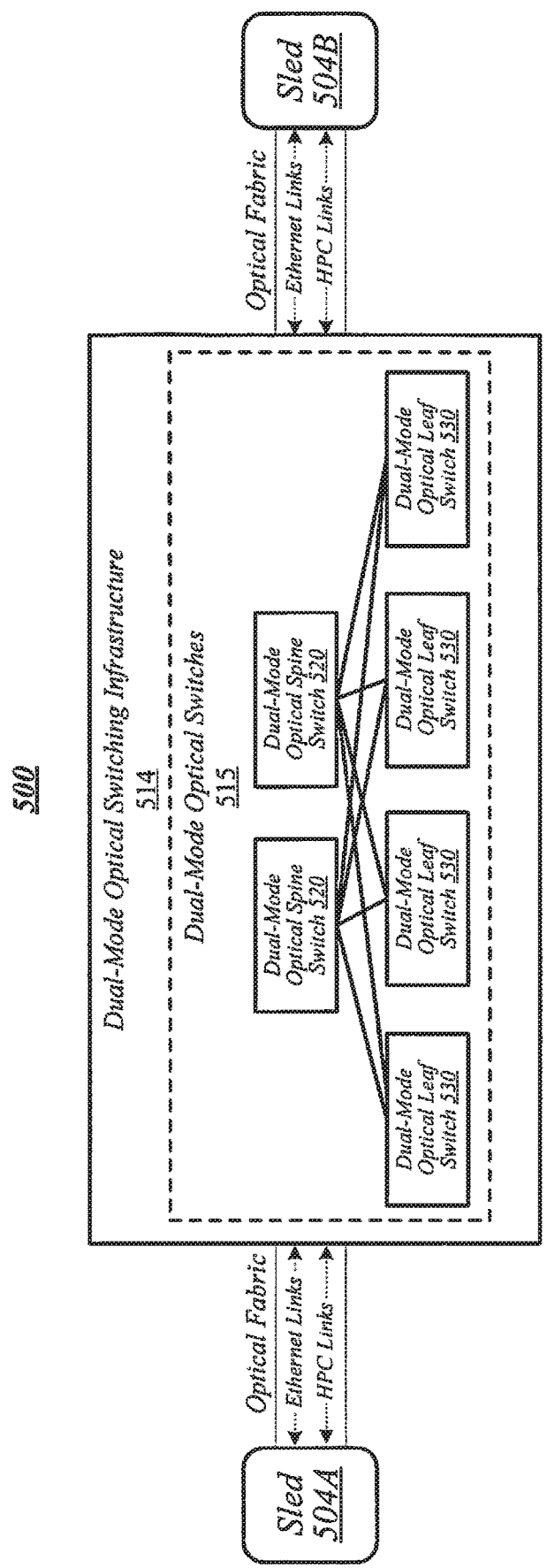
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
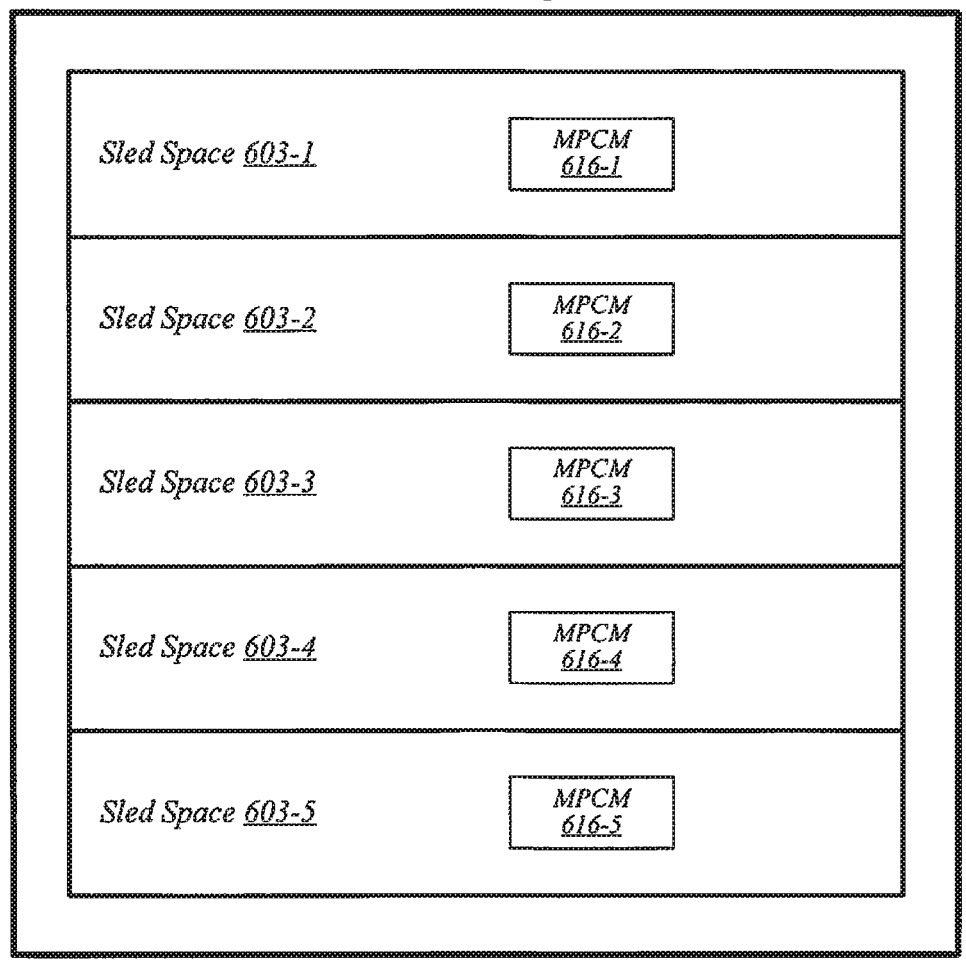
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
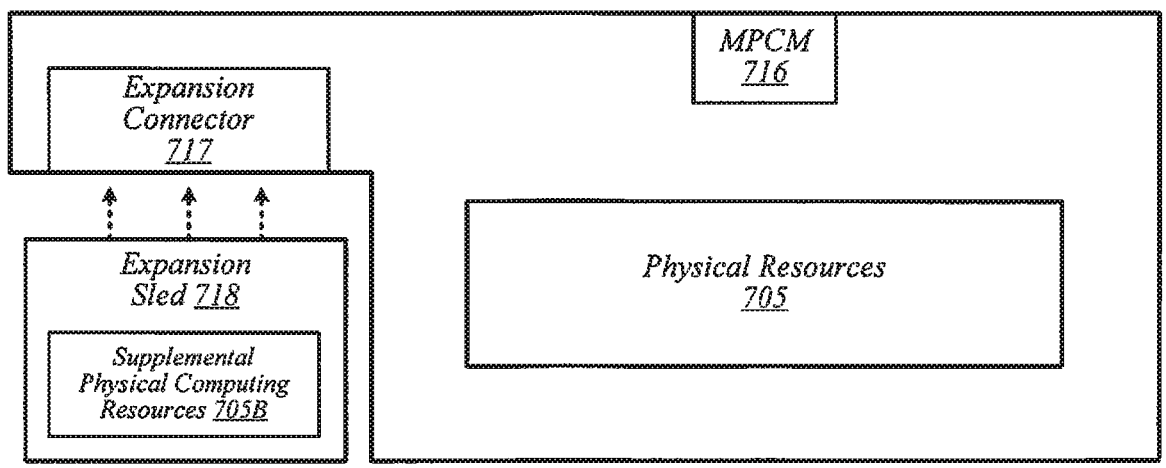
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
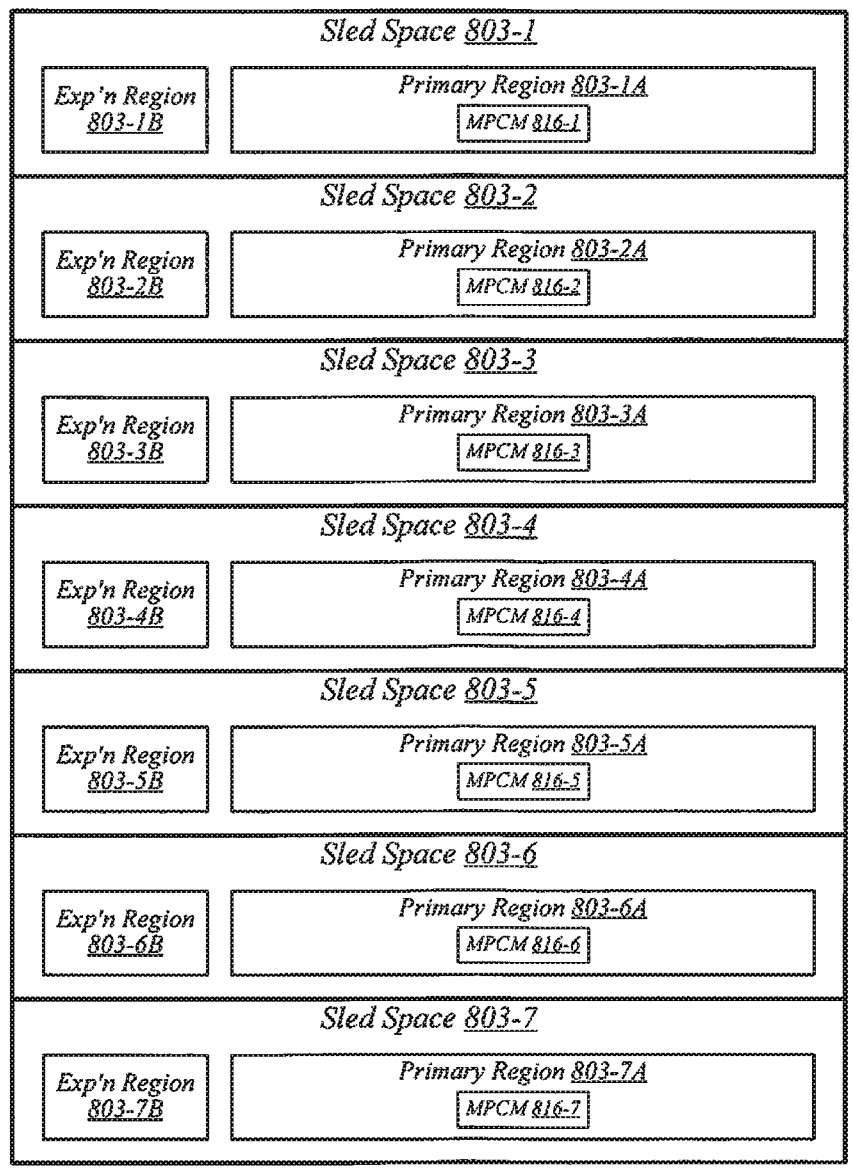
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
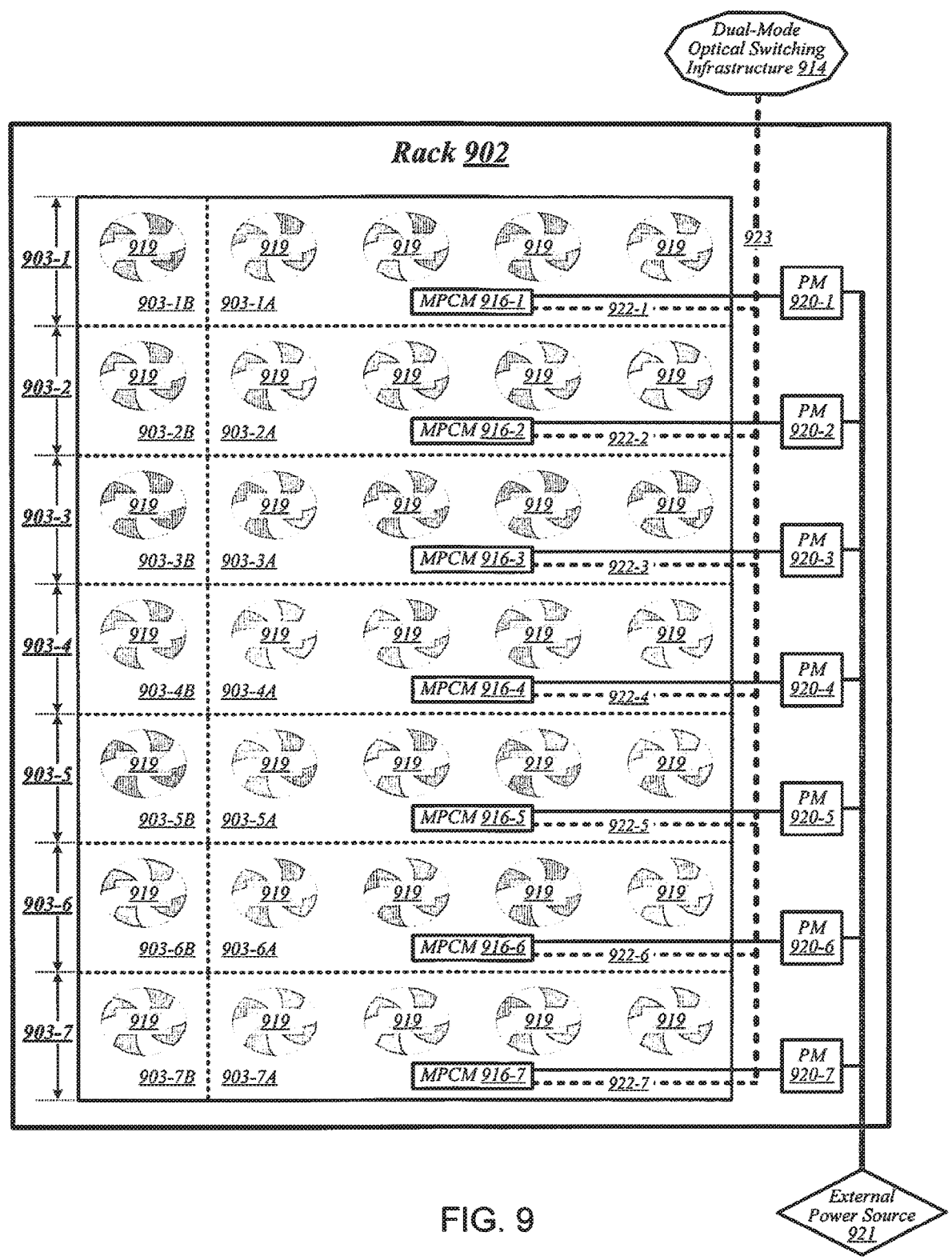
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
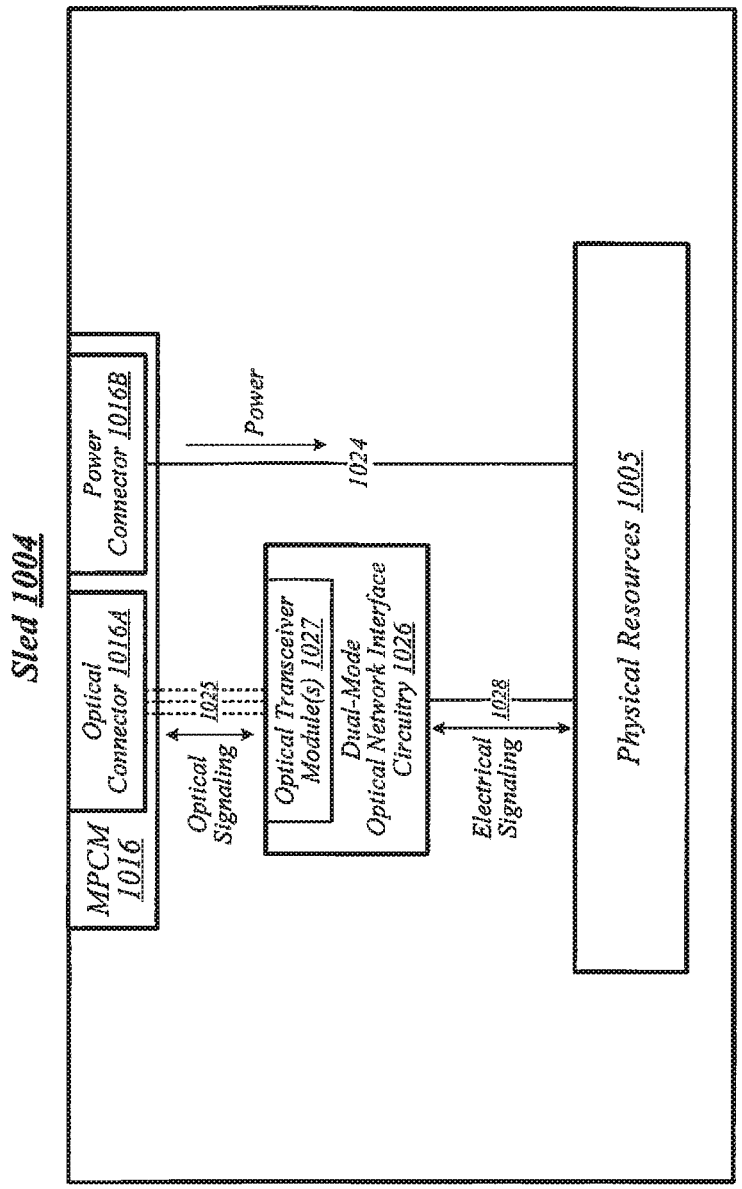
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
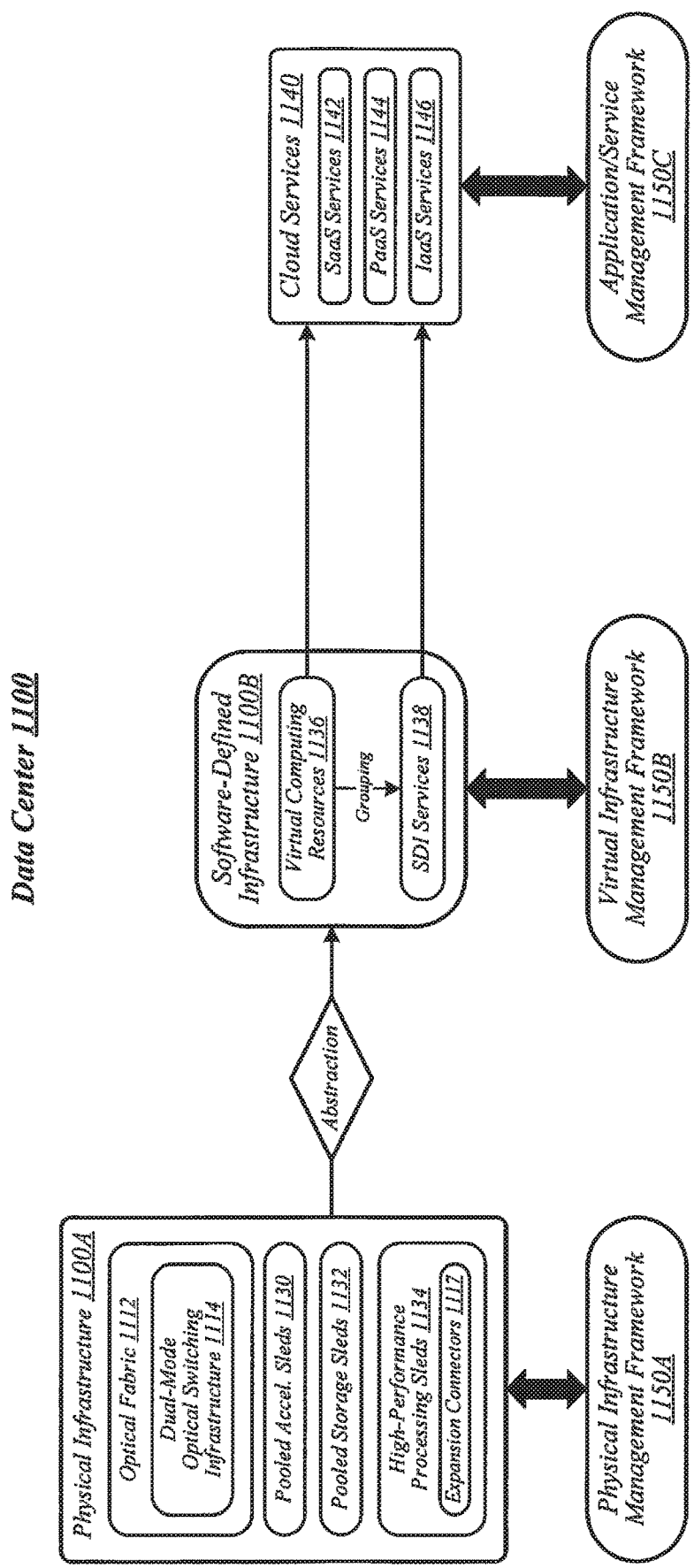
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
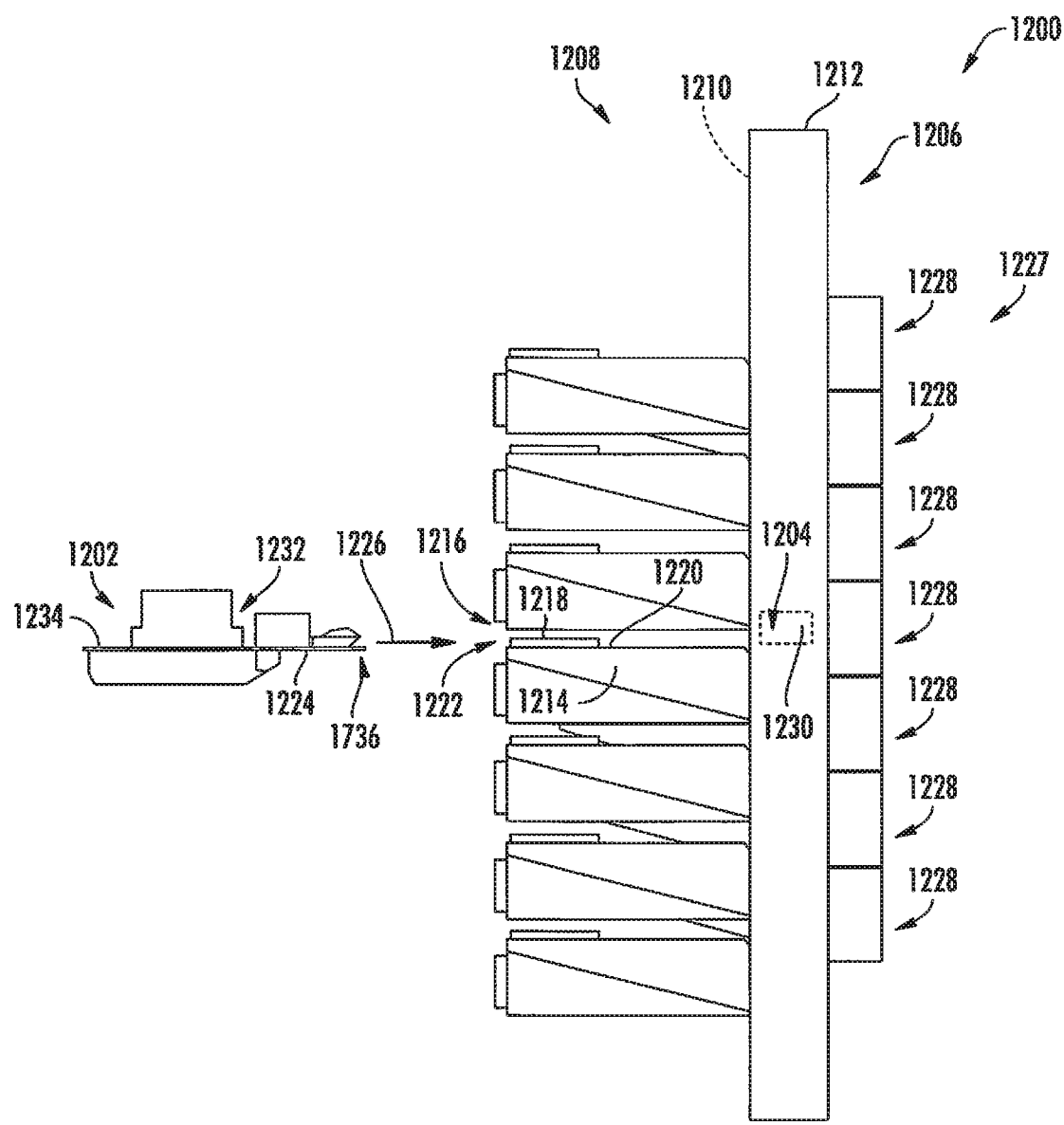
FIG. 12 is a partial diagrammatic view of at least one embodiment of a rack of the data center of FIGS. 1, 3, and 4, a sled designed for use in conjunction with the rack, and a data connector designed for use in conjunction with the rack and the sled.

Referring now to FIG. 12, in another embodiment, an illustrative data center 1200 includes one or more racks 1206 configured to house or otherwise receive one or more sleds 1202 for mounting therein. The data center 1200 may generally be representative of a data center or other type of computing network. Accordingly, the data center 1200 may be similar to, embodied as, or otherwise form a part of, the data centers 100, 300, 400, 1100 described above. The rack 1206 may house computing equipment comprising a set of physical resources, which may include processors, co-processors, accelerators, field programmable gate arrays (FPGAs), memory, and storage, for example. The rack 1206 may therefore be similar to, embodied as, or otherwise form a part of, the racks 102A-102D, 202, 302-1-302-32, 402A-402D, 902 described above. Additionally, in some embodiments, the rack 1206 may incorporate architecture similar to the aforementioned rack architectures 600, 800. The sled 1202 may be embodied as any type of server or server components such as a circuit board on which components such as CPUs, memory, and other components are placed. As such, the sled 1202 may be similar to, embodied as, or otherwise form a part of, the sleds 204-1-204-4, 404A-1, 404A-2, 404B-1, 404B-2, 404C-1, 404C-2, 404D-1, 404D-2, 504A, 504B, 704, 1004, 1130, 1132, 1134.

The data connector 1204 is coupled to the rack 1206 and may be communicatively coupled to, or otherwise form a part of, an optical fabric, which may include optical signaling media and/or optical switching infrastructure such as a dual-mode optical switching infrastructure. In that respect, the data connector 1204 may be coupled to, or otherwise form a part of, the optical fabrics 412, 1112, the optical cabling 922-1-922-7, and/or the dual-mode optical switching infrastructures 914, 1114 described above. The data connector 1204 may also be coupled to, or otherwise form a part of, the aforementioned dual-mode optical network interface circuitry 1026 and/or the optical transceiver modules 1027.

The illustrative data connector 1204 is sized to be received by the sled 1202 to establish an electrical connection between the data connector 1204 and the sled 1202. Prior to being received by the sled 1202, as further discussed below, electrical contacts 1440 of the data connector 1204 are protected from contaminants and/or foreign debris that may be encountered when the sled 1202 is removed from the rack 1206. In the process of being received by the sled 1202, the electrical contacts 1440 (see FIG. 14) are exposed to enable the data connector 1204 to mate with the sled 1202, as further discussed below. As will be apparent from the description below, the sled 1202 is designed to mate with the data connector 1204, thereby facilitating removal of the sled 1202 from the rack 1206, reinstallation of the sled 1202 in the rack 1206, replacement of the sled 1202, and/or upgrading of the sled 1202.

The illustrative rack 1206 includes two elongated support posts 1210, 1212 arranged vertically, as suggested by FIG. 12. The rack 1206 also includes one or more horizontal elongated support arms 1214 that extend outwardly from the support posts 1210, 1212. The support arms 1214 are configured to support one or more sleds, such as the sled 1202.

The elongated support arms 1214 may be coupled to the corresponding elongated support posts 1210, 1212 using any suitable securing mechanisms. For example, in some embodiments, the elongated support arms 1214 may be permanently attached to the corresponding elongated support posts 1210, 1212 via welds, adhesives, or other permanent securing mechanism. Alternatively, in other embodiments, the elongated support arms 1214 may be coupled to the corresponding elongated support posts 1210, 1212 using non-permanent securing mechanisms such as bolts, straps, or other securing devices. In such embodiments, the elongated support arms 1214 may be selectively coupled to the corresponding elongated support posts 1210, 1212 in one of multiple locations. That is, the elongated support arms 1214 may be adjustable, relative to the elongated support posts 1210, 1212, in some embodiments.

The elongated support arms 1214 cooperatively define sled slots 1216 of the illustrative rack 1206, as shown in FIG. 12. One such sled slot 1216 is configured to receive the sled 1202. To receive sleds such as the sled 1202, each elongated support arm 1214 includes a circuit board guide 1218 secured to, or otherwise mounted to, a top side 1220 of the corresponding elongated support arm 1214. For example, in the illustrative embodiment, each circuit board guide 1218 is a mounted at a distal end of the corresponding elongated support arm 1214 relative to the corresponding elongated support post 1210, 1212. The circuit board guide 1218 defines a circuit board slot 1222 that is configured to receive, in the illustrative embodiment, a chassis-less circuit board substrate 1224 of the sled 1202 when the sled 1202 is received in the corresponding sled slot 1216.

The illustrative sled 1202 is configured for installation in the rack 1206 by a user or a robot. The user or robot aligns the chassis-less circuit board substrate 1224 of the sled 1202 with the corresponding sled slot 1216 and the circuit board slot 1222. Then, the user or robot may slide the circuit board substrate 1224 in the direction indicated by arrow 1226 into the sled slot 1216 such that the substrate 1224 is received in the corresponding circuit board slot 1222, as shown in FIG. 12. When the sled 1202 is fully received by the sled slot 1216, the sled 1202 may fully mate with the data connector 1204 to establish the electrical connection between the sled 1202 and the data connector 1204, as further discussed below.

The illustrative rack 1206 includes seven pairs of elongated support arms 1214 that at least partially define a corresponding seven sled slots 1216, as suggested by FIG. 12. Of course, in other embodiments, the rack 1206 may include additional or fewer pairs of elongated support arms 1214 (i.e., additional or fewer sled slots 1216). It should be appreciated that because the sled 1202 is chassis-less, the sled 1202 has an overall reduced height relative to typical servers. As such, in some embodiments, the height of each sled slot 1216 may be shorter than the height of a typical server (e.g., shorter than a single rack unit, "1U"). That is, the vertical distance between each pair of elongated support arms 1214 may be less than a standard rank unit "1U." Additionally, due to the relative decrease in height of the sled slots 1216, the overall height of the rack 1206 may be shorter than the height of traditional rack enclosures. For example, in some embodiments, each of the elongated support posts 1210, 1212 may have a length of six feet or less. Again, in other embodiments, the rack 1206 may have different dimensions. Further, it should be appreciated that the rack 1206 does not include any walls, enclosures, or the like. Rather, the rack 1206 is an enclosure-less rack that is opened to the local environment. Of course, in some cases, an end plate may be attached to one of the elongated support posts 1210, 1212 in those situations in which the rack 1206 forms an end-of-row rack in the data center 1208.

The illustrative rack 1206 includes a fan array 1227 coupled thereto as shown in FIG. 12. The fan array 1227 may be coupled to, and supported by, cross-support arms (not shown) of the rack 1206. In any case, the fan array 1227 includes one or more rows of cooling fans 1228. In the illustrative embodiment, the fan array 1227 includes a row of cooling fans 1228 for each sled slot 1216 of the rack 1206.

The illustrative data connector 1204 is coupled to the rack 1206 as shown in FIG. 12. Specifically, in one embodiment, the data connector 1204 may be mounted to a stationary backplane or bulkhead 1230 that may be affixed to the rack 1206. In some embodiments, the data connector 1204 may be mounted to a platform of one of the cross-support arms. Regardless, the data connector 1204 is associated with a corresponding sled slot 1216 and is configured to mate with a corresponding connector or receptacle provided on the sled 1202 when the server sled 1202 is received in the corresponding sled slot 1216. Although only a single data connector 1204 is shown in FIG. 12 for clarity of the drawing, it should be appreciated that the rack 1206 may include a data connector 1204 for each sled slot 1216 of the rack 1206.

The illustrative sled 1202 includes one or more physical resources 1232 mounted to a top side 1234 of the chassis-less circuit board substrate 1224, as shown in FIG. 12. The physical resources 1232 may be embodied as any type of processor, controller, or other compute circuit capable of performing various tasks such as compute functions and/or controlling the functions of the sled 1202 depending on, for example, the type or intended functionality of the sled 1202. For example, the physical resources 1232 may be embodied as high-power processors in embodiments in which the sled 1202 is embodied as a compute sled, as accelerator co-processors or circuits in embodiments in which the sled 1202 is embodied as an accelerator sled, and/or as storage controllers in embodiments in which the sled 1202 is embodied as a storage sled. The sled 1202 may include one or more additional components, such as, but not limited to, a communication circuit having a network interface controller, physical resources in addition to those discussed above, an input/output (I/O) subsystem, a power connector, and one or more memory devices. In any case, as further discussed below, the illustrative sled 1202 includes a receptacle 1736 coupled to the chassis-less circuit board substrate 1224 that is sized to receive the data connector 1204.

Referring now to FIGS. 13-16, the illustrative data connector 1204 is shown in various connection states resulting from interaction with, or a lack of interaction with, the sled 1202, as further discussed below. That is, the data connector 1204 is shown in FIGS. 13-16 in various time during the connection of the data connector 1204 to the sled 1202 (e.g., while the sled 1202 is being installed into the rack 1206). Although the sled 1202 has been omitted from FIGS. 13-16 for the sake of clarity of the drawing, the various states of the data connector 1204 depicted in those figures are substantially identical to the various states of the data connector 1204 shown in respective FIGS. 17-20, in which the sled 1202 is shown. Accordingly, the paragraphs below describe one state of the data connector 1204 with reference to FIGS. 13 and 17, another state of the data connector 1204 with reference to FIGS. 14 and 18, yet another state of the data connector 1204 with reference to FIGS. 15 and 19, and yet another state still of the data connector 1204 with reference to FIGS. 16 and 20.

Figure 13:
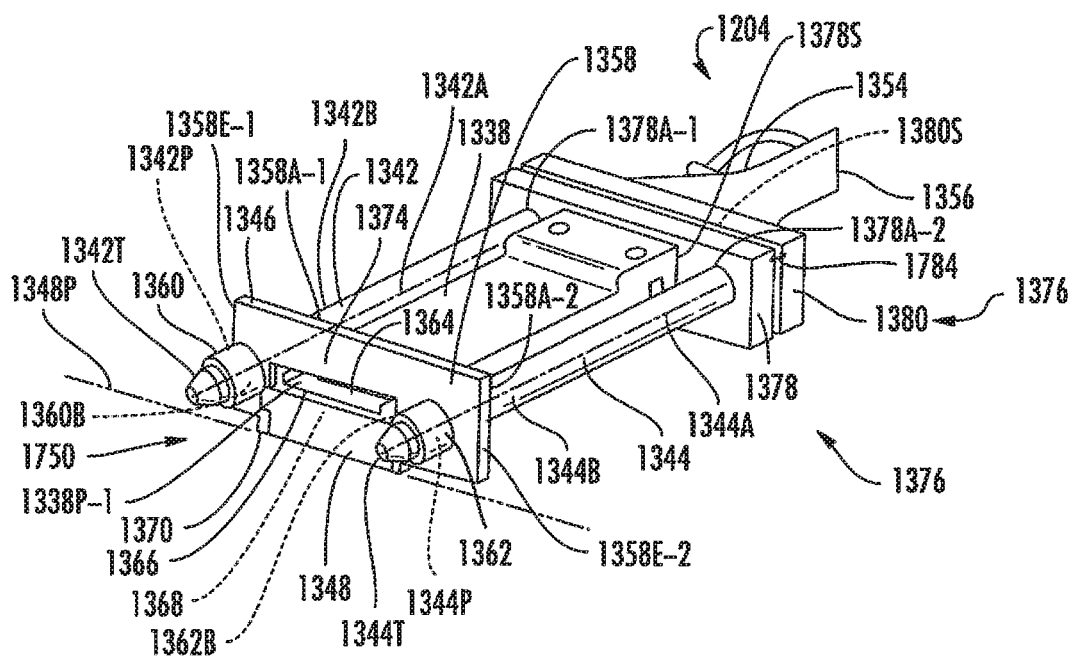
FIG. 13 is a perspective view of the data connector of FIG. 12 in a first state.

Referring now to FIGS. 13 and 17, the illustrative data connector 1204 is sized to be received by the receptacle 1736 of the sled 1202, as mentioned above. The data connector 1204 illustratively includes a main body 1338, guide shafts 1342, 1344, a cover 1346, and a door 1348. The main body 1338 includes the electrical contacts 1440 mentioned above. The guide shafts 1342, 1344 are associated with the main body 1338 and extend along respective longitudinal axes 1342A, 1344A thereof. The cover 1346 is coupled to the guide shafts 1342, 1344 such that the cover 1346 is slidable along the guide shafts 1342, 1344 in a direction defined by the axes 1342A, 1344A. The door 1348 is coupled to the cover 1346 to pivot relative to the cover 1346 between a closed position 1750, in which access to the electrical contacts 1440 is restricted, and an open position 1852, in which access to the electrical contacts 1440 is permitted, as discussed below. In this way, the cover 1346 provides an amount of protection for the electrical contacts 1404 from the local environment when the data connector 1204 is not in use (i.e., not coupled to a sled 1202).

In the illustrative embodiment, the main body 1338 of the data connector 1204 is embodied as, or otherwise provides, a quad small form-factor pluggable (QSFP) connector. The illustrative data connector 1204 is coupled to a terminating end 1354 of a fiber optic cable 1356. In other embodiments, however, the main body 1338 may provide a suitable interconnect other than a four-lane interconnect. Additionally, in other embodiments, the data connector 1204 may be coupled to another suitable type of cable, such as a copper cable, for example.

The illustrative data connector 1204 includes two guide shafts 1342, 1344, as shown in FIG. 13. In other embodiments, however, the connector 1204 may include another suitable number of guide shafts other than two. In any case, the guide shafts 1342, 1344 include respective shaft bodies 1342B, 1344B interconnected with respective shaft tips 1342T, 1344T. The illustrative shaft bodies 1342B, 1344B have a circular cross-sectional shape. The illustrative shaft tips 1342T, 1344T have a frustoconical cross-sectional shape. In other embodiments, however, the shaft bodies 1342B, 1344B and the shaft tips 1342T, 1344T may take the shape of other suitable geometric forms.

The cover 1346 is illustratively positioned on the guide shafts 1342, 1344 to shield covered portions 1342P, 1344P thereof from contaminants before the portions 1342P, 1344P are received by the receptacle 1736, as shown in FIG. 17. The illustrative cover 1346 includes a faceplate 1358, shaft shields 1360, 1362, a cutout 1364, and a door flange 1370. Those components of the cover 1346 are described in greater detail below.

The illustrative faceplate 1358 of the cover 1346 extends transverse to the longitudinal axes 1342A, 1344A between the guide shafts 1342, 1344, as shown in FIG. 13. Additionally, the faceplate 1358 extends transverse to the longitudinal axes 1342A, 1344A beyond the guide shafts 1342, 1344 such that opposite ends 1358E-1, 1358E-2 of the faceplate 1358 are located exteriorly of the guide shafts 1342, 1344. In the illustrative embodiment, the faceplate 1358 has a rectangular cross-sectional shape. However, in other embodiments, the faceplate 1358 may take the shape of another suitable geometric form. In any case, the faceplate 1358 includes two apertures 1358A-1, 1358A-2 extending therethrough that are sized to receive the guide shafts 1342, 1344.

The illustrative shaft shields 1360, 1362 of the cover 1346 are interconnected with, and extend outwardly away from, the faceplate 1358, as shown in FIG. 13. The shaft shields 1360, 1362 include respective bores 1360B, 1362B aligned with the apertures 1358A-1, 1358A-2. As such, the shaft shields 1360, 1362 are sized to receive the guide shafts 1342, 1344 such that the portions 1342P, 1344P are covered and surrounded by the shields 1360, 1362 when the guide shafts 1342, 1344 are received by the shaft shields 1360, 1362. When the guide shafts 1342, 1344 are received by the shaft shields 1360, 1362 and the main body 1338 is received by the cutout 1364, the main body 1338 is arranged between the covered portions 1342P, 1344P of the guide shafts 1342, 1344. In the illustrative embodiment, the shaft shields 1360, 1362 have a circular cross-sectional shape. In other embodiments, however, the shields 1360, 1362 may take the shape of other suitable geometric forms.

The illustrative cutout 1364 of the cover 1346 is sized to receive the main body 1338, as shown in FIG. 13. The cutout 1364 extends through a rectangular projection 1374 that extends outwardly away from the faceplate 1358. Additionally, the cutout 1364 extends through the faceplate 1358. The cutout 1364 is arranged between the shaft shields 1360, 1362 and includes a window 1366 and a window 1368, each of which extends through the projection 1374 and the faceplate 1358. The window 1366 is open to receive a portion 1338P-1 of the main body 1338 when the door 1348 is in each of the closed position 1750 and the open position 1852. The window 1368 opens to receive a portion 1338P-2 of the main body 1338 separate from the portion 1338P-1 that provides the electrical contacts 1440 when the door 1348 pivots relative to the cover 1346 from the closed position 1750 to the open position 1852. However, when the door 1348 is in the closed position 1750, the window 1368 is closed off by the door 1348 and therefore unable to receive the portion 1338P-2.

The illustrative door flange 1370 of the cover 1346 is interconnected with, and extends outwardly away from, the projection 1374, as shown in FIG. 13. The door flange 1370 is configured to interface with the door 1348 to enable the door 1348 to pivot relative to the cover 1346 about a pivot axis 1348P between the closed position 1750 and the open position 1852. In the illustrative embodiment, the door 1348 is coupled to the flange 1370 to pivot relative to the flange 1370 about the axis 1348P. A pivot pin 1772 may be received by the door 1348 and the flange 1370 to enable the door 1348 to pivot relative to the flange 1370 about the axis 1348P.

The illustrative door 1348 of the data connector 1204 has a rectangular shape complementary to the shape of the window 1368, as shown in FIG. 13. When the guide shafts 1342, 1344 are received by the shaft shields 1360, 1362, the door 1348 is arranged between the covered portions 1342P, 1344P of the guide shafts 1342, 1344. In the illustrative embodiment, the door 1348 is biased to the closed position 1750 by one or more biasing elements (not shown), such as one or more springs, for example.

The illustrative data connector 1204 also includes a mounting block 1376 to attach the connector 1204 to the stationary backplane 1230, as shown in FIGS. 13 and 17. The illustrative mounting block 1376 includes mounting plates 1378, 1380 that are spaced from each other in an axial direction indicated by arrow 1782 to define a gap 1784 therebetween. As best seen in FIG. 17, the backplane 1230 is aligned with the gap 1784. The mounting plate 1378 includes apertures 1378A-1, 1378A-2 sized to receive the respective guide shafts 1342, 1344 and a rectangular slot 1378S sized to receive the main body 1338. The mounting plate 1380 includes a slot 1380S sized to receive the terminating end 1354 of the fiber optic cable 1356. The end 1354 may interface with the main body 1338 in the gap 1784 or in the slot 1380S.

When the tips 1342T, 1344T of the guide shafts 1342, 1344 are spaced from the receptacle 1736 of the sled 1202 in the axial direction 1782 as shown in FIG. 17, the door 1348 is in the closed position 1750. As such, the door 1348 protects the electrical contacts 1440 from contaminants that may be encountered in the local environment prior to interaction between the data connector 1204 and the receptacle 1736. As discussed below, in response to certain interaction between the data connector 1204 and the receptacle 1736, the door 1348 pivots relative to the cover 1346 from the closed position 1750 to the open position 1852.

Figure 14:
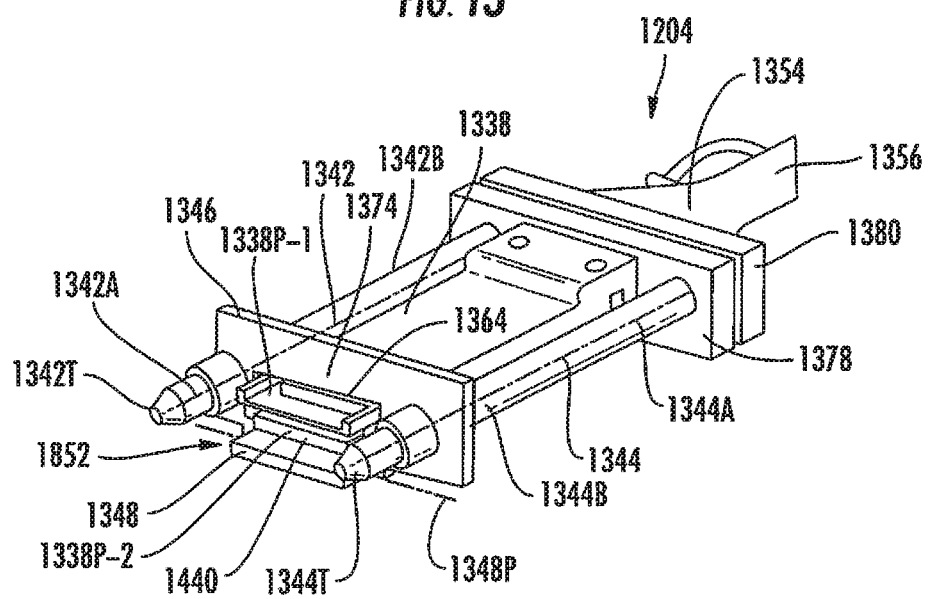
FIG. 14 is a perspective view similar to FIG. 13 of the data connector in a second state.

Referring now to FIGS. 14 and 18, the illustrative data connector 1204 is sized for receipt in a receiving space 1886 defined by the receptacle 1736. The receptacle 1736 is illustratively embodied as, or otherwise includes, a cage or housing designed to interface with a QSFP connector. The receptacle 1736 includes a flange 1888 that defines an end 1890 thereof and extends above the receiving space 1886.

Compared to a position 1792 of the receptacle 1736 shown in FIG. 17, the receptacle 1736 is displaced further toward the guide shafts 1342, 1344 of the data connector 1204 in the axial direction 1782 in a position 1892 shown in FIG. 18 as the sled 1202 is installed into the rack 1206. As such, the tips 1342T, 1344T of the guide shafts 1342, 1344 are located in the receiving space 1886 when the receptacle 1736 is in the position 1892. The tips 1342T, 1344T illustratively extend a distance D1 into the receiving space 1886 that is greater than a threshold distance D when the receptacle 1736 is in the position 1892. The door 1348 is in the open position 1852 when the tips 1342T, 1344T extend into the receiving space 1886 over the distance D1, as shown in FIG. 18. Of course, it should be appreciated that when the receptacle 1736 is displaced from the position 1792 toward the position 1892, the tips 1342T, 1344T extend a distance D2 into the receiving space 1886 that is less than the threshold distance D, at least before the receptacle 1736 reaches the position 1892. The door 1348 is in the closed position 1750 when the tips 1342T, 1344T extend into the receiving space 1886 over the distance D2.

When the receptacle 1736 is in the position 1892, the shaft shields 1360, 1362 of the cover 1346 illustratively contact the flange 1888, as shown in FIG. 18. In response to contact between the cover 1346 and the flange 1888, the door 1348 pivots relative to the cover 1346 from the closed position 1750 to the open position 1852. Contact between the cover 1346 and the flange 1888 may overcome the biasing force applied by the one or more biasing elements to the door 1348, thereby facilitating pivoting of the door 1348 relative to the cover 1346 from the closed position 1750 to the open position 1852.

In the illustrative embodiment, when in the closed position 1750, the door 1348 is angularly spaced relative to the door 1348 when the door 1348 is in the open position 1852 by 90 degrees, as shown in FIGS. 17 and 18. When the door 1348 pivots relative to the cover 1346 from the closed position 1750 to the open position 1852 in response to contact between the cover 1346 and the flange 1888, the door 1348 pivots 90 degrees relative to the cover 1346 in a counterclockwise direction CCW. When the door 1348 pivots to the open position 1852, the electrical contacts 1440 of the main body 1338 are exposed and may be accessed, as best seen in FIG. 14.

Figure 15:
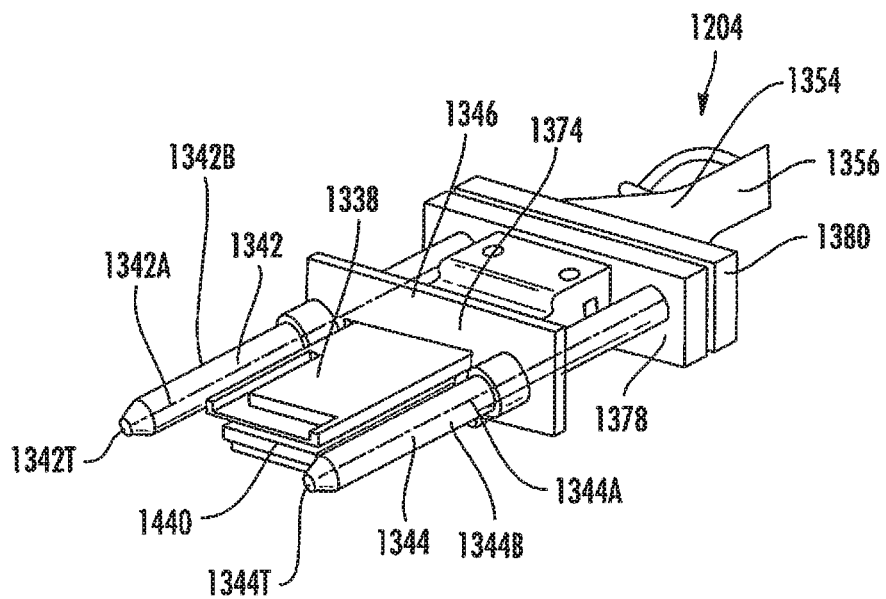
FIG. 15 is a perspective view similar to FIG. 13 of the data connector in a third state.

Referring now to FIGS. 15 and 19, the receptacle 1736 is further displaced toward the backplane 1230 in the axial direction 1782 to cause the cover 1346 to slide along the guide shafts 1342, 1344 to the right in the direction 1782. Contact between the cover 1346 and the flange 1888 causes the cover 1346 to slide along the guide shafts 1342, 1344 to the right in the direction 1782. Accordingly, the flange 1888 constrains the cover 1346 against movement toward the receiving space 1886 in the direction 1782 in response to contact between the flange 1888 and the cover 1346. Compared to the position 1892 of the receptacle 1736 shown in FIG. 18, the receptacle 1736 is therefore displaced to the right in the axial direction 1782 in the position 1992 shown in FIG. 19. The tips 1342T, 1344T illustratively extend a distance D3 into the receiving space 1886 that is greater than the distance D1 when the receptacle 1736 is in the position 1992. Additionally, after the door 1348 pivots to the open position 1852, the electrical contacts 1440 protrude through the window 1368 of the cover 1346 as shown in FIG. 15 when the receptacle 1736 is in the position 1992.

Figure 16:
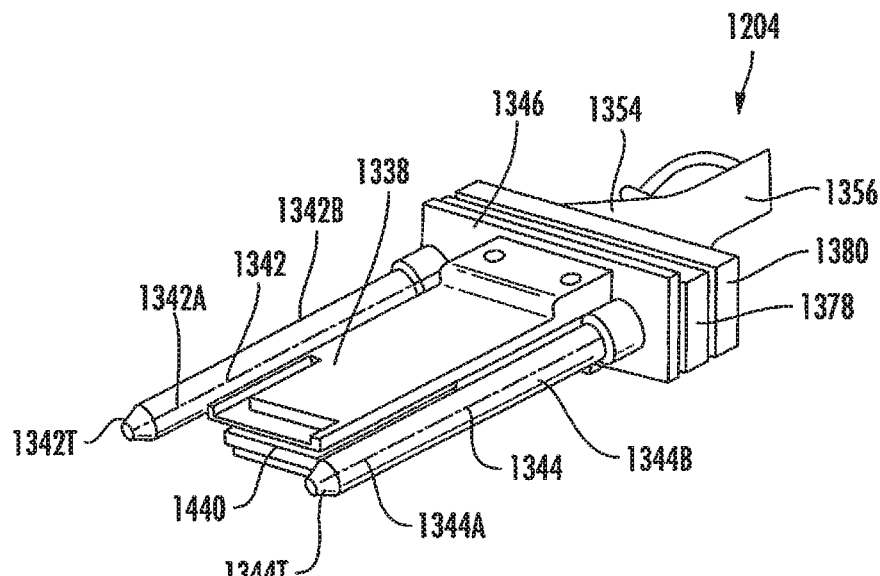
FIG. 16 is a perspective view similar to FIG. 13 of the data connector in a fourth state.

Referring now to FIGS. 16 and 20, the receptacle 1736 is displaced further still toward the backplane 1230 in the axial direction 1782 to cause the cover 1346 to slide along the guide shafts 1342, 1344 to the right in the direction 1782 so that the cover 1346 is arranged in close proximity to the mounting block 1376. As indicated above, contact between the cover 1346 and the flange 1888 causes the cover 1346 to slide along the guide shafts 1342, 1344 to the right in the direction 1782. The receptacle 1736 is displaced further toward the backplane 1230 in the axial direction 1782 in the position 2092 shown in FIG. 20 than in the position 1992. The tips 1342T, 1344T illustratively extend a distance D4 into the receiving space 1886 that is greater than the distance D3 when the receptacle 1736 is in the position 2092. Additionally, after the door 1348 pivots to the open position 1852, the electrical contacts 1440 protrude through the window 1368 of the cover 1346 as shown in FIG. 16 when the receptacle 1736 is in the position 2092. When the electrical contacts 1440 protrude through the window 1368 as shown in FIGS. 16 and 20, the contacts 1440 may interface with counterpart features provided on the sled 1202 to electrically connect the data connector 1204 to the sled 1202.

As discussed above, the door 1348 pivots relative to the cover 1346 from the closed position 1750 to the open position 1852 in response to movement of the sled 1202 to the right in the axial direction 1782 relative to the data connector 1204, as shown in FIGS. 17-20. Once the door 1348 moves to the open position 1852, further movement of the sled 1202 to the right in the axial direction 1782 (i.e., when the receptacle 1736 is in the position 2092) establishes an electrical connection between the data connector 1204 and the sled 1202. Thus, when the data connector 1204 is retained in one of the sled slots 1216, the sled 1202 may be advanced into the one of the slots 1216 until the data connector 1204 is fully received by the receptacle 1736, thereby establishing the electrical connection between the data connector 1204 and the sled 1202 without visual observation of the interaction between the data connector 1204 and the receptacle 1736. As such, in the illustrative embodiment, the sled 1202 is configured to mate with the data connector 1204, as mentioned above. Additionally, in the illustrative embodiment, the data connector 1204 is sized to be received by the receptacle 1736 of the sled 1202 despite some degree of misalignment between the data connector 1204 and the receptacle 1736 in a direction 2000 that is perpendicular to the axial direction 1782 and the longitudinal axes 1342A, 1344A. Accordingly, some degree of float between the illustrative data connector 1204 and the illustrative sled 1202 is permitted when those components interact with one another.

Figure 21:
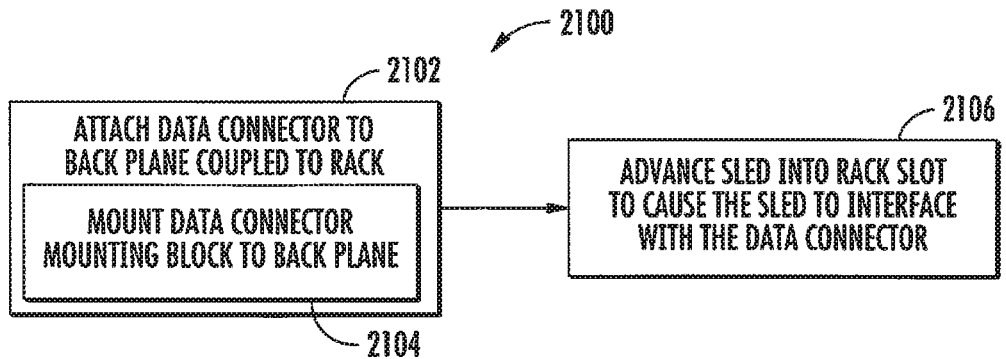
FIG. 21 is a simplified flowchart of at least one embodiment of a method for installing a sled in the rack of FIG. 12.

Referring now to FIG. 21, an illustrative method 2100 of installing the sled 1202 in the rack 1206 of the data center 1208 is shown. The method 2100 begins with block 2102 in which the data connector 1204 is attached to the stationary backplane 1230 coupled to the rack 1206. To do so, in block 2104, the mounting block 1376 of the data connector 1204 may be mounted to the backplane 1230. Subsequently, in block 2106, the sled 1202 may be advanced into one of the sled slots 1216 to cause the sled 1202 to interface or mate with the data connector 1204. It should be appreciated, of course, that the method 2100 may be performed in a number of sequences other than the illustrative sequence of FIG. 21. Additionally, it should be appreciated that advancing the sled 1202 into one of the sled slots 1216 to cause the sled 1202 to interface with the data connector 1204, as indicated in block 2106, may be performed in a number of sequences other than the sequence described below with reference to FIG. 22.

Figure 22:
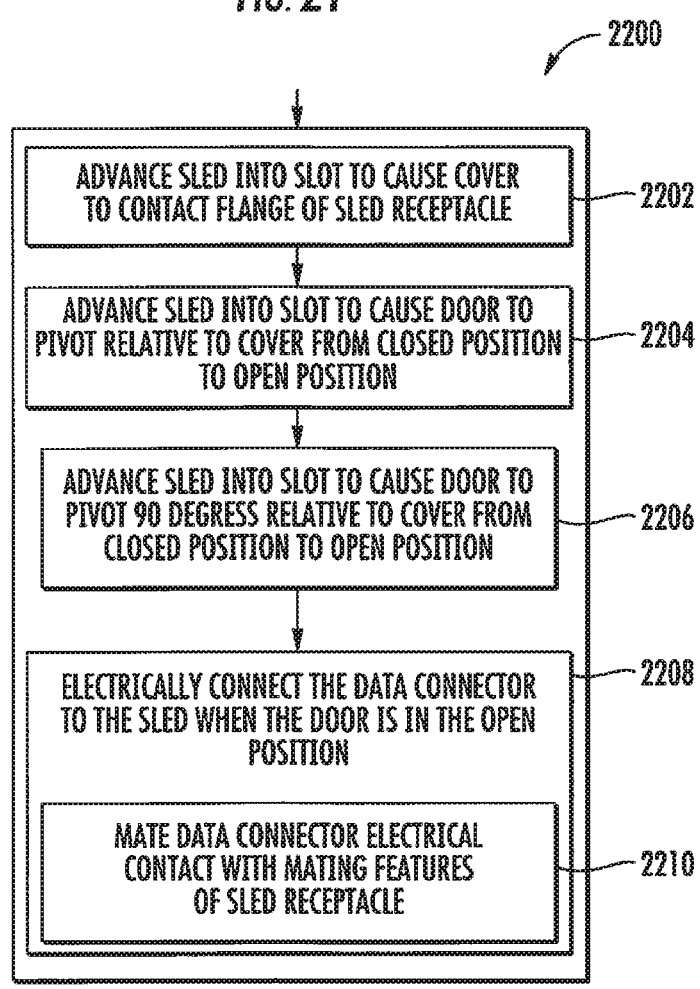
FIG. 22 is a simplified flowchart of at least one embodiment of a method for advancing s sled into a rack slot of the rack of FIG. 12, which may be executed as an execution block of the method of FIG. 21.

Referring now to FIG. 22, a method 2200 for advancing a sled 1202 into a sled slot 1216 of the rack 1206, which may be executed as part of block 2106 of method 2100, begins with block 2202. In block 2202, the sled 1202 is advanced into the one of the sled slots 1216 to cause the cover 1346 of the data connector 1204 to contact the flange 1888 of the receptacle 1736 (see, e.g., FIG. 17). Additionally, in block 2204, the sled 1202 is advanced further into the sled slot 1216 to cause the door 1348 to pivot relative to the cover 1346 from the closed position 1750 to the open position 1852 (see, e.g., FIG. 18). As discussed above, the door 1348 moves from the closed position 1750 to the open position 1852 in response to contact between the flange 1888 and the cover 1346. In block 2206, the sled 1202 is advanced yet further into the sled slot 1216 to cause the door 1348 to pivot to a fully open position 1852 of about 90 degrees relative to the cover 1346 (see, e.g., FIG. 19). Subsequently, in block 2208, the sled 1202 is fully advanced into the sled slot 1216 such that electrical connection between the data connector 1204 and the sled 1202 is established (see, e.g., FIG. 20). To do so, in block 2210, the electrical contacts 1440 of the main body 1338 of the data connector 1204 are mated with counterpart features of the sled 1202.

EXAMPLES

Illustrative examples of the technologies disclosed herein are provided below. An embodiment of the technologies may include any one or more, and any combination of, the examples described below.

Example 1 includes a data connector to interface with a sled, the data connector comprising a main body that includes electrical contacts; a plurality of guide shafts associated with the main body, wherein each guide shaft extends along a corresponding longitudinal axis; a cover coupled to the plurality of guide shafts such that the cover is slidable along the guide shafts in a direction defined by the longitudinal axes; and a door coupled to the cover and movable to pivot relative thereto between (i) a closed position in which access to the electrical contacts of the main body is restricted and (ii) an open position in which access to the electrical contacts of the main body is permitted.

Example 2 includes the subject matter of Example 1, and wherein a portion of each guide shaft that extends outwardly from the cover is increased as the cover is slid along the guide shafts.

Example 3 includes the subject matter of any of Examples 1 and 2, and wherein a greater portion of the guide shafts extend outwardly from the cover when the door is in the open position relative to when the door is in the closed position.

Example 4 includes the subject matter of any of Examples 1-3, and wherein the door pivots relative to the cover from the closed position to the open position as the cover is slid along the guide shafts.

Example 5 includes the subject matter of any of Examples 1-4, and wherein the door pivots 90 degrees relative to the cover from the closed position to the open position as the cover is slid along the guide shafts.

Example 6 includes the subject matter of any of Examples 1-5, and wherein the cover comprises a pair of shaft shields and each guide shaft extends through a corresponding shaft shield, wherein each shaft shield covers a covered portion of the corresponding guide shaft and wherein the covered portion of the guide shafts is dependent on the position of the cover along the guide shafts.

Example 7 includes the subject matter of any of Examples 1-6, and wherein the door is located between the shaft shields of the cover.

Example 8 includes the subject matter of any of Examples 1-7, and wherein the main body is located between the shaft shields of the cover.

Example 9 includes the subject matter of any of Examples 1-8, and wherein the guide shafts include no more than two guide shafts.

Example 10 includes the subject matter of any of Examples 1-9, and wherein the cover includes a cutout sized to receive the main body, wherein the cutout includes a first window in which a first portion of the main body is received when the door is in each of the closed and open positions.

Example 11 includes the subject matter of any of Examples 1-10, and wherein the cutout includes a second window to receive a second portion of the main body, separate from the first portion and that includes the electrical contacts, when the door is in the open position.

Example 12 includes the subject matter of any of Examples 1-11, and wherein the main body forms a quad small form-factor pluggable connector.

Example 13 includes the subject matter of any of Examples 1-12, and wherein the data connector is coupled to a terminating end of a fiber optic cable.

Example 14 includes the subject matter of any of Examples 1-13, and further including a mounting block to attach the data connector to a stationary backplane.

Example 15 includes a system comprising a sled for operation in a rack of a data center, the sled including a circuit board substrate, one or more physical resources coupled to the circuit board substrate, and a receptacle coupled to the circuit board substrate; and a data connector sized to be received by the receptacle, the data connector including a main body that includes electrical contacts; guide shafts that extend along longitudinal axes thereof; a cover coupled to the guide shafts to slide along the longitudinal axes; and a door coupled to the cover to pivot relative thereto between (i) a closed position in which access to the electrical contacts of the main body is restricted and (ii) an open position in which access to the electrical contacts of the main body is permitted.

Example 16 includes the subject matter of Example 15, and wherein (i) tips of the guide shafts extend a first distance into the receptacle that is less than a threshold distance when the door is in the closed position and (ii) the tips of the guide shafts extend a second distance into the receptacle that is greater than the threshold distance when the door is in the open position.

Example 17 includes the subject matter of any of Examples 15 and 16, and wherein the door is in the closed position when the tips of the guide shafts are spaced from the receptacle in an axial direction parallel to the longitudinal axes.

Example 18 includes the subject matter of any of Examples 15-17, and wherein (i) the data connector is sized to be received by the receptacle to cause the cover to contact a flange of the receptacle and (ii) the door pivots relative to the cover from the closed position to the open position in response to contact between the cover and the flange.

Example 19 includes the subject matter of any of Examples 15-18, and wherein the door pivots 90 degrees relative to the cover from the closed position to the open position in response to contact between the cover and the flange.

Example 20 includes the subject matter of any of Examples 15-19, and wherein the flange constrains the cover against movement toward the receptacle in an axial direction parallel to the longitudinal axes in response to contact between the cover and the flange.

Example 21 includes the subject matter of any of Examples 15-20, and wherein the cover comprises a pair of shaft shields and each guide shaft extends through a corresponding shaft shield, wherein each shaft shield covers a covered portion of the corresponding guide shaft and wherein the covered portion of the guide shafts is dependent on the position of the cover along the guide shafts.

Example 22 includes the subject matter of any of Examples 15-21, and wherein the door is located between the shaft shields of the cover.

Example 23 includes the subject matter of any of Examples 15-22, and wherein the main body is located between the shaft shields of the cover.

Example 24 includes the subject matter of any of Examples 15-23, and wherein the guide shafts include no more than two guide shafts.

Example 25 includes the subject matter of any of Examples 15-24, and wherein the cover includes a cutout sized to receive the main body, wherein the cutout includes a first window in which a first portion of the main body is received in when the door is in each of the closed and open positions.

Example 26 includes the subject matter of any of Examples 15-25, and wherein the cutout includes a second window to receive a second portion of the main body, separate from the first portion and that includes the electrical contacts, when the door is in the open position.

Example 27 includes the subject matter of any of Examples 15-26, and wherein the main body forms a quad small form-factor pluggable connector.

Example 28 includes the subject matter of any of Examples 15-27, and wherein the data connector is coupled to a terminating end of a fiber optic cable.

Example 29 includes the subject matter of any of Examples 15-28, and wherein the data connector includes a mounting block to attach the data connector to a stationary backplane coupled to the rack.

Example 30 includes the subject matter of any of Examples 15-29, and wherein the data connector is sized to be received by the receptacle while facilitating a degree of misalignment between the data connector and the receptacle in a direction perpendicular to the longitudinal axes.

Example 31 includes a method for installing a sled in a rack of a data center, the method comprising attaching a data connector to a stationary backplane coupled to the rack; and advancing the sled into a slot formed in the rack to cause the sled to interface with the data connector, wherein advancing the sled into the slot comprises advancing the sled into the slot to cause a door of the data connector to pivot relative to a cover of the data connector from (i) a closed position in which access to electrical contacts of the data connector is restricted and (ii) open position in which access to the electrical contacts is permitted so that the electrical contacts may interface with the sled.

Example 32 includes the subject matter of Example 31, and wherein attaching the data connector to the stationary backplane comprises mounting a mounting block of the data connector to the stationary backplane.

Example 33 includes the subject matter of any of Examples 31 and 32, and wherein advancing the sled into the slot further comprises advancing the sled into the slot to cause the cover to contact a flange of the sled such that the door pivots relative to the cover from the closed position to the open position in response to contact between the cover and the flange.

Example 34 includes the subject matter of any of Examples 31-33, and wherein advancing the sled into the slot to cause the door to pivot relative to the cover comprises advancing the sled into the slot to cause the door to pivot 90 degrees relative to the cover from the closed position to the open position.

Example 35 includes the subject matter of any of Examples 31-34, and wherein advancing the sled into the slot further comprises electrically connecting the data connector to the sled when the door is in the open position.

The invention claimed is:

1. A data connector to interface with a sled, the data connector comprising:
a main body that includes electrical contacts;
a plurality of guide shafts associated with the main body, wherein each guide shaft extends along a corresponding longitudinal axis;
a cover coupled to the plurality of guide shafts such that the cover is slidable along the guide shafts in a direction defined by the longitudinal axes; and
a door coupled to the cover and movable to pivot relative thereto between (i) a closed position in which access to the electrical contacts of the main body is restricted and (ii) an open position in which access to the electrical contacts of the main body is permitted.

2. The data connector of claim 1, wherein a portion of each guide shaft that extends outwardly from the cover is increased as the cover is slid along the guide shafts.

3. The data connector of claim 2, wherein a greater portion of the guide shafts extend outwardly from the cover when the door is in the open position relative to when the door is in the closed position.

4. The data connector of claim 1, wherein the door pivots 90 degrees relative to the cover from the closed position to the open position as the cover is slid along the guide shafts.

5. The data connector of claim 1, wherein the cover comprises a pair of shaft shields and each guide shaft extends through a corresponding shaft shield, wherein each shaft shield covers a covered portion of the corresponding guide shaft and wherein the covered portion of the guide shafts is dependent on the position of the cover along the guide shafts.

6. The data connector of claim 5, wherein the door is located between the shaft shields of the cover.

7. The data connector of claim 6, wherein the main body is located between the shaft shields of the cover.

8. The data connector of claim 7, wherein the guide shafts include no more than two guide shafts.

9. The data connector of claim 1, wherein the cover includes a cutout sized to receive the main body, wherein the cutout includes a first window in which a first portion of the main body is received when the door is in each of the closed and open positions.

10. The data connector of claim 9, wherein the cutout includes a second window to receive a second portion of the main body, separate from the first portion and that includes the electrical contacts, when the door is in the open position.

11. The data connector of claim 1, wherein the main body forms a quad small form-factor pluggable connector.

12. The data connector of claim 1, further comprising a mounting block to attach the data connector to a stationary backplane.

13. A system comprising:
a sled for operation in a rack of a data center, the sled including a circuit board substrate, one or more physical resources coupled to the circuit board substrate, and a receptacle coupled to the circuit board substrate; and
a data connector sized to be received by the receptacle, the data connector including:
a main body that includes electrical contacts;
guide shafts that extend along longitudinal axes thereof;
a cover coupled to the guide shafts to slide along the longitudinal axes; and
a door coupled to the cover to pivot relative thereto between (i) a closed position in which access to the electrical contacts of the main body is restricted and (ii) an open position in which access to the electrical contacts of the main body is permitted.

14. The system of claim 13, wherein (i) tips of the guide shafts extend a first distance into the receptacle that is less than a threshold distance when the door is in the closed position and (ii) the tips of the guide shafts extend a second distance into the receptacle that is greater than the threshold distance when the door is in the open position.

15. The system of claim 14, wherein the door is in the closed position when the tips of the guide shafts are spaced from the receptacle in an axial direction parallel to the longitudinal axes.

16. The system of claim 13, wherein (i) the data connector is sized to be received by the receptacle to cause the cover to contact a flange of the receptacle and (ii) the door pivots 90 degrees relative to the cover from the closed position to the open position in response to contact between the cover and the flange.

17. The system of claim 16, wherein the flange constrains the cover against movement toward the receptacle in an axial direction parallel to the longitudinal axes in response to contact between the cover and the flange.

18. The system of claim 13, wherein the cover comprises a pair of shaft shields and each guide shaft extends through a corresponding shaft shield, wherein each shaft shield covers a covered portion of the corresponding guide shaft and wherein the covered portion of the guide shafts is dependent on the position of the cover along the guide shafts.

19. The system of claim 18, wherein the door and the main body are each located between the shaft shields of the cover.

20. The system of claim 13, wherein the cover includes a cutout sized to receive the main body, wherein the cutout includes a first window in which a first portion of the main body is received in when the door is in each of the closed and open positions.

21. The system of claim 20, wherein the cutout includes a second window to receive a second portion of the main body, separate from the first portion and that includes the electrical contacts, when the door is in the open position.

22. The system of claim 13, wherein the data connector is sized to be received by the receptacle while facilitating a degree of misalignment between the data connector and the receptacle in a direction perpendicular to the longitudinal axes.

23. A method for installing a sled in a rack of a data center, the method comprising:
attaching a data connector to a stationary backplane coupled to the rack; and
advancing the sled into a slot formed in the rack to cause the sled to interface with the data connector, wherein advancing the sled into the slot comprises advancing the sled into the slot to cause a door of the data connector to pivot relative to a cover of the data connector from (i) a closed position in which access to electrical contacts of the data connector is restricted and (ii) open position in which access to the electrical contacts is permitted so that the electrical contacts may interface with the sled.

24. The method of claim 23, wherein advancing the sled into the slot further comprises advancing the sled into the slot to cause the cover to contact a flange of the sled such that the door pivots 90 degrees relative to the cover from the closed position to the open position in response to contact between the cover and the flange.

25. The method of claim 23, wherein advancing the sled into the slot further comprises electrically connecting the data connector to the sled when the door is in the open position.

* * * * *